(12) United States Patent
Tellex

(10) Patent No.: US 6,289,836 B1
(45) Date of Patent: Sep. 18, 2001

(54) MARINE FENDER

(76) Inventor: Michael Tellex, 14605 Horseshoe Trace, Wellington, FL (US) 33414

( * ) Notice: Subject to any disclaimer, the term of this patent is extended or adjusted under 35 U.S.C. 154(b) by 0 days.

(21) Appl. No.: 09/586,999

(22) Filed: Jun. 5, 2000

Related U.S. Application Data

(60) Provisional application No. 60/188,754, filed on Mar. 13, 2000.

(51) Int. Cl.$^7$ ............................. B63B 59/02; E02B 3/26
(52) U.S. Cl. ..................... 114/219; 267/140; 405/215
(58) Field of Search ................... 114/219; 267/140; 405/215

(56) References Cited

U.S. PATENT DOCUMENTS

| | | | |
|---|---|---|---|
| 3,169,756 | * 2/1965 | Miller | 267/113 |
| 3,411,304 | * 11/1968 | Miller | 405/215 |
| 3,638,985 | * 2/1972 | Barton et al. | 293/122 |
| 4,063,526 | 12/1977 | Ueda . | |
| 4,072,334 | 2/1978 | Seegmiller . | |
| 4,281,610 | * 8/1981 | Young | 114/219 |
| 5,031,564 | * 7/1991 | Beckerer, Jr. | 114/219 |
| 5,269,248 | * 12/1993 | Lee | 114/219 |
| 5,429,063 | 7/1995 | Rosenkranz . | |
| 5,562,364 | 10/1996 | Darder-Alomar . | |
| 5,762,016 | * 6/1998 | Parsons | 114/219 |

FOREIGN PATENT DOCUMENTS

86/00051 * 1/1986 (WO) ............................. 114/219

\* cited by examiner

*Primary Examiner*—S. Joseph Morano
*Assistant Examiner*—Andy Wright
(74) *Attorney, Agent, or Firm*—Alvin S. Blum

(57) ABSTRACT

A marine fender for securely affixing to an object such as a dock, piling, seawall, and the like is formed by extrusion of a resilient material. It is provided with unique energy absorbing properties. The fender has a uniform cross section with an outer arcuate wall, and an inner arcuate wall. Strips connect the two walls to transmit forces from items impinging on the outer wall to the smaller arch of the inner wall. A planar panel connects the two walls and transmits any remaining forces to the object on which the fender is mounted. Flanges coextensive with the outer wall enable the fender to be securely affixed to the object.

15 Claims, 1 Drawing Sheet

MARINE FENDER

This invention is based upon provisional patent application Ser. No. 60/188,754, filed Mar. 13, 2000, entitled FENDER, incorporated herein by reference.

BACKGROUND OF THE INVENTION

This invention relates to marine fenders for mounting on objects such as docks, piers, seawalls, and the like to cushion collisions with other objects such as boats, rafts, and the like and more specifically to an extruded marine fender with unique energy absorbing properties.

DESCRIPTION OF THE PRIOR ART

Fenders for this purpose are well known in the prior. They include old tires, woven rope bundles, and extruded resilient tubes with attached flanges for fastening to objects. A compromise is generally made between structure strong enough to resist great force and soft enough to avoid damage.

SUMMARY OF THE INVENTION

It is accordingly an object of the invention to provide an extruded structure with a sufficiently soft external surface to cushion a colliding object without damage thereto, while providing an internal structure with greater resistance to deformation to resist great force. The fender of the invention includes an outer cylindrical surface and an inner cylindrical surface. The two cylindrical surfaces have a common axis. The two cylinders are joined by a plurality of strips, which transmit forces on the outer surface to the inner cylinder, as the outer cylinder yields to these forces, as well as absorbing some of the impact energy. Having a smaller radius, the inner cylinder will not yield as readily, all other things being equal. Arches are well known for their ability to hold great loads. The yielding of the outer cylindrical surface absorbs some of the energy of impact, and presents a larger surface to the impacting object. Means continuous with the outer cylinder are further provided for attachment of the fender to one or more planar surfaces, such as pilings, seawalls, docks, floating platforms, and bulkheads. These include one or more planar panels that join the inner and outer cylinders and terminate in mounting flanges. Whatever forces are not absorbed by the fender are transmitted by the planar panel(s) to the object on which the fender is mounted. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
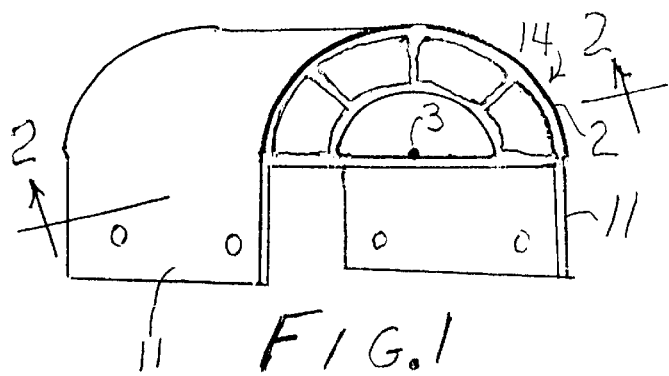
FIG. 1 is a perspective view of an extruded fender of the invention.

Referring now to the drawings, the various embodiments of the invention are extruded from a resilient plastic. An ultraviolet resistant, resilient polyvinyl chloride plastic, specifically GEON C9000™, has been found suitable, but other plastics well known in the art may be employed as well. The various embodiments shown share a common internal structure with a double wall for high energy absorption. An arcuate outer wall is connected by a plurality of connecting walls to an inner arcuate wall that has a much smaller radius. By this construction, the outer wall will be more yielding, while transmitting distorting forces to the inner arch wall that is less yielding. Consequently, the overall fender is able to absorb far greater energy with relatively thinner walls. The plastic is extruded by means well known in the art to economically form the structure with a uniform cross section that can be cut to any length as desired.

Figure 2:
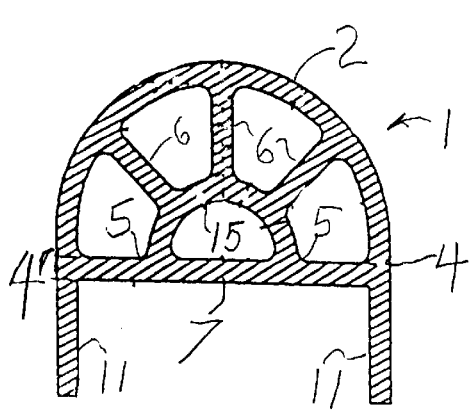
FIG. 2 is a sectional view taken on line 2—2 of FIG. 1.

Referring now first to FIGS. 1 and 2, a section cut from an extrusion forming the fender 14 of the invention comprises a body of uniform cross section 1. It has an outer arcuate wall 2; an inner arcuate wall 15; a plurality of planar strips 6 connecting the inner and outer walls between the ends of the walls; a planar panel 7 joining the ends 4 of the outer wall with the ends 5 of the inner wall; and mounting flanges 11 extending orthogonally from the panel for fastening to the object on which it is to be mounted. When force is applied to the outer wall, it flexes, taking up some energy and presenting a broader face to the impinging object. Some of the force is transmitted to the strips 6, and from there to the inner wall 15, which flexes less readily because it is an arc of a smaller radius. The two arcuate walls may have substantially the same axis 3. They need not be arcs of perfect circles to function in this way. Any remaining forces are transmitted over a large surface area of the object on which the fender is mounted by the planar panel.

Figure 3:
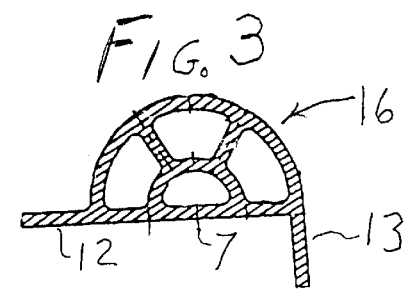
FIG. 3 is a sectional view of another embodiment of the invention.

Referring now to FIG. 3, another embodiment of the invention 16 is shown that is more suitable for mounting in other situations. One mounting flange 12 is coplanar with the panel 7, and the other mounting flange 13 is orthogonal to the panel.

Figure 4:
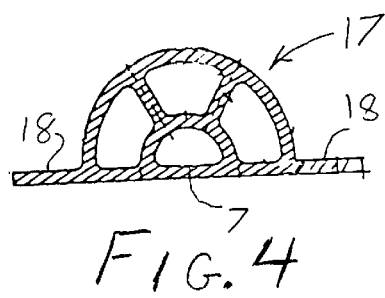
FIG. 4 is a sectional view of another embodiment of the invention for mounting on a planar surface.

Referring now to FIG. 4, another embodiment 17 of the invention is shown in which the mounting flanges 18 are both coplanar with the panel 7 so as to be easily mounted on a planar surface, such as a seawall.

Figure 5:
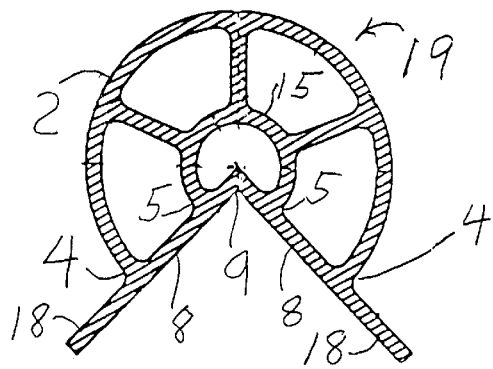
FIG. 5 is another embodiment of the invention.

Referring now to FIG. 5, another embodiment 19 of the invention is shown that is more suitable for mounting on sharp corners. A pair of planar panels 8 intersects at a central line 9. Each of the panels 8 joins one end 4 of the outer wall 2 to one end 5 of the inner wall 15. Mounting flanges 18, which are continuous with the outer wall 2, are each coplanar with its adjacent planar panel, with which it is also continuous.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. An energy absorbing marine fender for mounting on an object, the fender comprising:
 a body having a uniform cross section including;
  a) an outer arcuate wall having two ends;
  b) an inner arcuate wall substantially coaxial with the outer coaxial wall, and having two ends;

c) a plurality of strips joining the inner and outer arcuate walls between the ends of the inner and outer arcuate walls;

d) no more than two planar panels joining together all of the ends of the inner and outer arcuate walls;

e) two planar mounting flanges for securely directly affixing the fender to the object that is to absorb the energy of collision with an item that impinges on the outer arcuate wall, each of said flanges being continuous with one of the ends of the outer arcuate wall, and f) the no more than two planar panels disposed to transmit said energy directly to the object.

2. The fender according to claim 1 in which a single planar panel joins all of the ends of the inner and outer arcuate walls.

3. The fender according to claim 2 in which said flanges are coplanar with the planar panel.

4. The fender according to claim 2 in which said flanges are substantially orthogonal to the planar panel.

5. The fender according to claim 2 in which one of said flanges is substantially orthogonal to the planar panel and the other of said flanges is coplanar with the planar panel.

6. The fender according to claim 1 in when there are two planar panels which are not coplanar and that intersect and join at a central region, each of said planar panels joining one end of the inner and outer arcuate walls.

7. The fender according to claim 6 in which the mounting flanges are coplanar to their respective panels.

8. The fender according to claim 1 constructed so as to be formable by extrusion.

9. The fender according to claim 1 in which the strips are substantially planar.

10. A marine fender for affixing to an object that is to absorb forces from a water borne collision with an item, the fender comprising:

an elongate resilient body having a uniform cross section so as to be formable in one piece by extrusion including:

a) an outer, generally cylindrical, wall having two ends;

b) an inner, generally cylindrical, wall having two ends;

c) a plurality of strips joining the inner and outer walls between the ends of the inner and outer walls;

d) a planar panel joining the ends of the inner and outer walls for application to a surface of the object for transmitting collision forces not absorbed by the outer wall, the strips, and the inner wall directly from the panel to the object; and e) a pair of mounting flange means for affixing directly to the object, each said flange means being continuous with an outer margin of the planar panel.

11. The fender according to claim 10 in which said flange means are coplanar with the planar panel.

12. The fender according to claim 10 in which said flange means are substantially orthogonal to the planar panel.

13. The fender according to claim 10 in which one of said flange means is substantially orthogonal to the planar panel and the other of said flange means is coplanar with the planar panel.

14. A marine fender for affixing to an object that is to absorb forces from a water borne collision with an item, the fender comprising:

an elongate resilient body having a uniform cross section so as to be formable in one piece by extrusion including:

a) an outer, generally cylindrical, wall having two ends;

b) an inner, generally cylindrical, wall having two ends;

c) a plurality of strips joining the inner and outer walls between the ends of the inner and outer walls;

d) a pair of planar panels which intersect and join at a central region, each one of the panels joining one end of ends of the inner and outer walls for application directly to a surface of the object for transmitting collision forces not absorbed by the outer wall, the strips, and the inner wall directly from the panels to the object; and e) a pair of mounting flange means for affixing directly to the object, each said flange means being continuous with an outer margin of one of the planar panels.

15. The fender according to claim 14 in which said flange means are substantially coplanar with the planar panels.

* * * * *